United States Patent

[11] 3,593,402

| [72] | Inventor | Masunori Mori<br>No. 5 Nozaki 21, Wakayama Prefecture, Japan |
|---|---|---|
| [21] | Appl. No. | 849,094 |
| [22] | Filed | Aug. 11, 1969 |
| [45] | Patented | July 20, 1971 |
| [32] | Priority | Aug. 19, 1968, Sept. 25, 1968 |
| [33] | | Japan |
| [31] | | 43/59079 and 43/69265 |

[54] APPARATUS FOR ALIGNING THE ENDS OF CYLINDRICAL SECTIONS TO BE JOINED
6 Claims, 9 Drawing Figs.

[52] U.S. Cl. .................................................. 29/200 P, 228/4, 228/44, 269/131
[51] Int. Cl. .................................................. B23p 19/00
[50] Field of Search .......................................... 29/200 P, 282; 228/4, 6, 15, 44, 47; 269/1, 2, 130, 131

[56] References Cited
UNITED STATES PATENTS

| 2,054,375 | 9/1936 | Halle | 228/4 |
| 3,070,056 | 12/1962 | Hill | 269/131 |
| 3,330,021 | 7/1967 | Jacobsen | 29/200 |
| 3,469,299 | 9/1969 | Rogers | 29/200 |

Primary Examiner—Granville Y. Custer, Jr.
Attorney—Clario Ceccon

ABSTRACT: Apparatus for aligning two cylindrical members includes a roller chain wrapped around one of the cylindrical members and a plurality of plates secured to the roller chain. Tightening of the roller chain causes one end of the plates to bear against the second cylindrical member and align it with the first cylindrical member.

PATENTED JUL20 1971

APPARATUS FOR ALIGNING THE ENDS OF CYLINDRICAL SECTIONS TO BE JOINED

This invention relates to apparatus for aligning the ends of cylindrical sections which have to be joined and, more particularly, to such apparatus comprising a link chain on the outer peripheral surface of one of two cylinders to be joined.

In producing cylindrical drums such as a tank made of steel, the generally adopted prior art method consists of an operation in which a steelplate is first curved to form a cylinder and then a plurality of such cylindrical sections are joined and welded together.

However, when a cylindrical section is produced by curving a steelplate through bending rolls or some other pressing process, it is almost impossible to form a real circle, and more or less visible deformations are the result, so that it is virtually impossible to avoid oval configurations.

When two adjoining ends of cylindrical sections are connected, such as by welding, a disagreement in the peripheries of the sections is unavoidable, so that, in accordance with the conventional methods, the internal surface of the end portions of a cylindrical section is then usually pressed with a jack, or a piece is welded on the concave surface of the cylindrical section and a wedge is introduced along the other end of the section against the projected portions thereof, with the result that the concave portion is pushed out and a temporary welding may be effected. However, when a jack is used, the alignment of the ends of large-diameter sections to be joined is rendered difficult and, furthermore, the efficiency of the operation is poor because of the internal operations necessary. Particularly in summer, the fatigue of the workers is considerable, because of heat and, when auxiliary and temporary pieces are used, these must be removed after welding. A polishing operation must be carried out after the removal, and a great deal of complementary, time-consuming procedures are required. In addition, defective scars are unavoidable after the welding and removal operations, the appearance of the product is affected, and the commercial value thereof is lowered.

It is therefore an object of this invention to provide a novel apparatus for the alignment of ends of cylindrical sections which are to be joined, which apparatus makes it possible to carry out such alignment in a smooth manner and without employing complementary alignment operations within the cylinders as it is with the conventional methods. Consequently, the efficiency of the operation is substantially improved and the workers can carry out the operation without great efforts. Furthermore, it is not necessary to carry out the welding and removing operations after the alignment and no subsequent polishing operation is needed. Also, no deformation or scars are visible on the surface of the cylinder, and the appearance of the product is excellent.

In accordance with one aspect of this invention, a first adjustable band is wound about and tightened on the peripheral surface of one of the two cylinders to be joined and at least two plates are fixed on a portion of said band. Then a portion of the plates is brought into contact with one of the cylindrical sections, pushing the other cylindrical section in accordance with the position of screws in the upper portion of the plates so that misalignment of the ends of two cylindrical sections can be corrected.

Additional objects and advantages of this invention may be understood by referring to the following detailed description taken in conjunction with the accompanying drawings.

Figure 1:
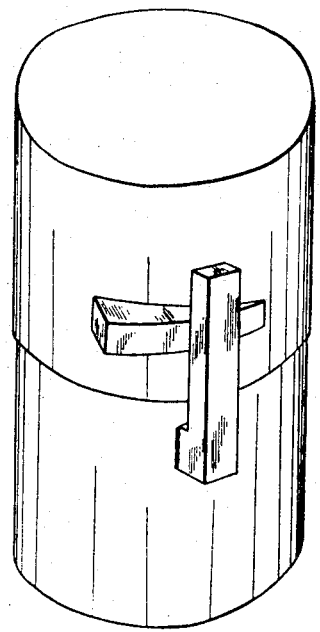
FIG. 1 is a perspective view of a conventional method for aligning ends of cylindrical sections according to prior art.
Figure 8:
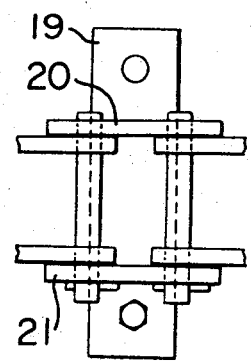
FIG. 8 is an elevational view of a part of the embodiment shown in FIG. 6.

Referring to FIG. 1, there is shown an example of prior art, wherein a wedge and a welded piece are employed. The welded piece has to be removed, after the aligning operation by pushing the wedge into the space immediately outside of the cylindrical section. Polishing of the outside surface of the cylindrical section is required. Therefore, this method has a great deal of drawbacks as has been previously stated.

Figure 2:
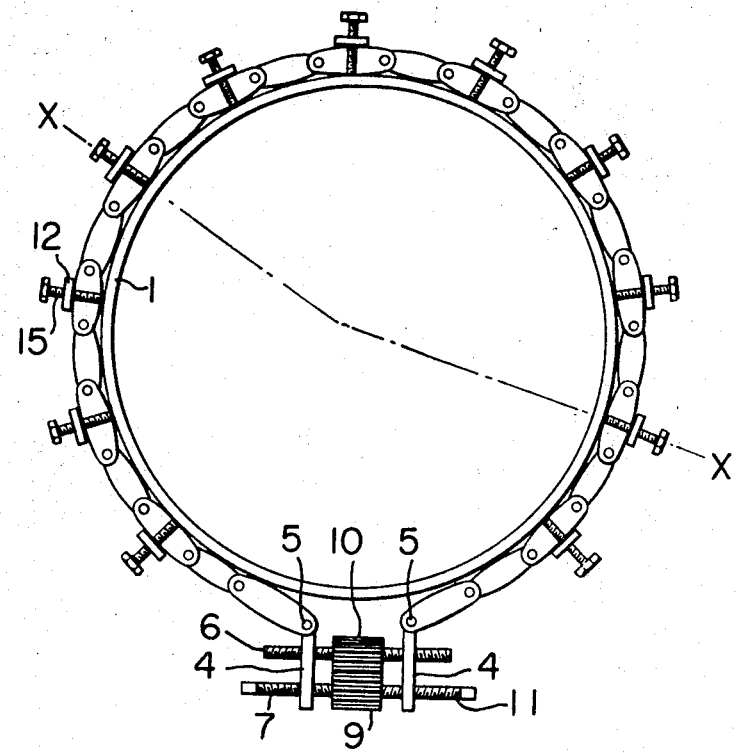
FIG. 2 is a plan view of apparatus for aligning ends of cylindrical sections in accordance with the present invention.
Figure 3:
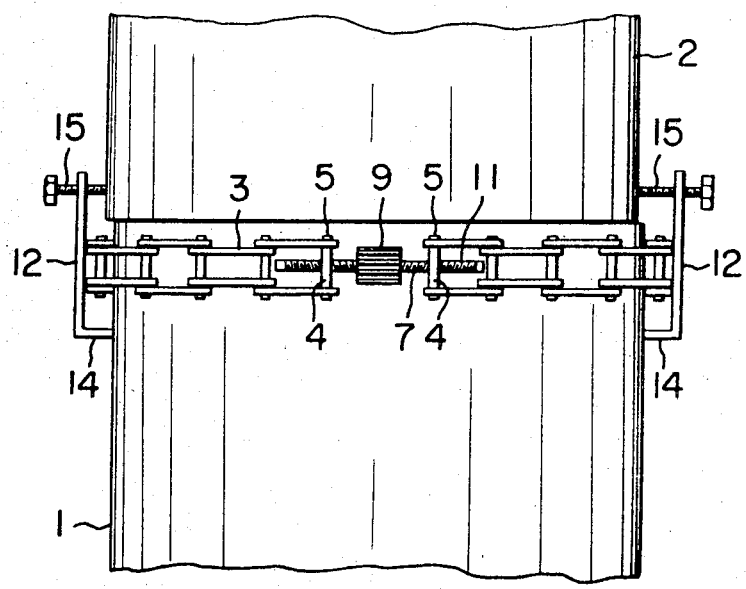
FIG. 3 is an elevational view of the apparatus shown in FIG. 2, all but two of the plates and corresponding screws having been omitted for purpose of clarity.
Figure 4:
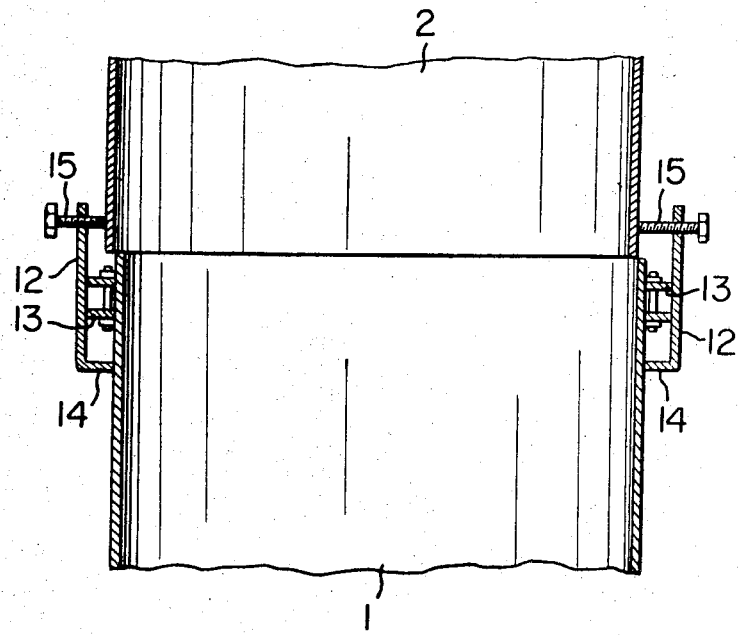
FIG. 4 is the cross-sectional elevational view along the line x—x of FIG. 2.

Now, according to the present invention, and particularly referring to FIGS. 2, 3 and 4, the ends of first and second cylindrical sections 1 and 2 are placed in abutment with each other, and adjustable band such as a linked roller chain 3 is wound about one of said sections 1 to be joined for adjusting the position of said section. Binders 4 are provided at the terminal link of said linked roller chain 3 and are also mounted upon a pair of oppositely threaded shafts 6 and 7. The threaded shafts 6, 7 have intermeshing gear means 9, 10 mounted thereon intermediate the binders 4, whereby rotation of one of said shafts effects a variation in the effective length of said linked roller chain 3 connected thereto. A suitable tool can be applied to the head 11 of the threaded shaft 7 for turning the shaft. Since the threads on the two shafts 6 and 7 are in the opposite directions, said binders 4 are pulled inwardly or towards each other to tighten the linked roller chain. Since the binders 4 are rotatably coupled with pins 5 to the end link plate of the roller chain 3, turning of the threaded shafts strongly binds said linked roller chain without any trouble, and the peripheral section of the first cylindrical section can be varied into circular shape.

In FIG. 2, link plates 12 are L-shaped and fixedly attached to a selected link 13 of the roller chain 3. The foot 14 of said L-shaped plate 12 is made approximately equal to the width of said link. A screw 15 is inserted through the upper end of said link plate 12 to contact the second cylindrical section 2 to vary the peripheral cross section of the second cylindrical section 1 in accordance with the variations in said first cylindrical section 1 that are caused by variations in said adjustable linkage means 3.

Figure 5:
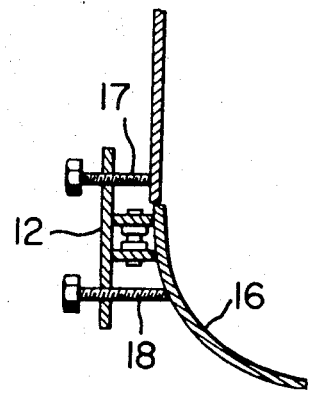
FIG. 5 is a fragmentary cross-sectional elevational view of another embodiment of the apparatus as applied to a cylindrical section and an end plate, according to the present invention.
Figure 6:
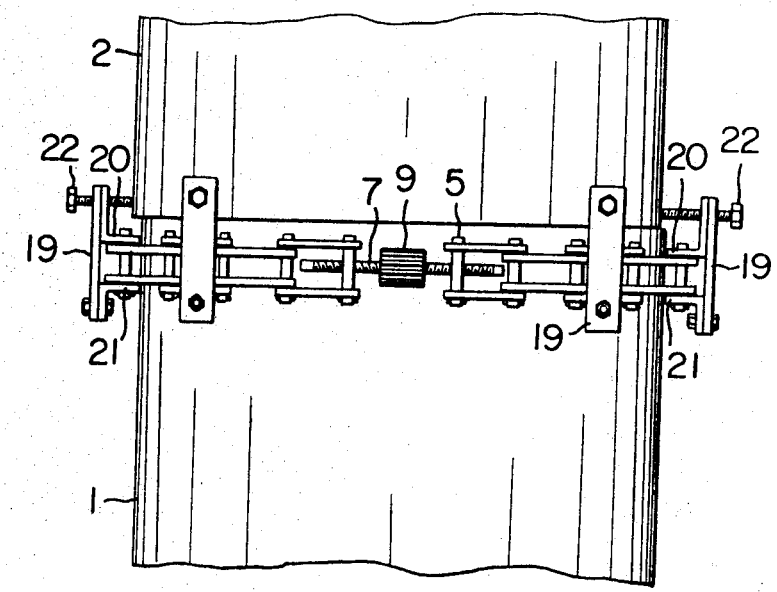
FIG. 6 is an elevational view of another embodiment of the present invention.
Figure 7:
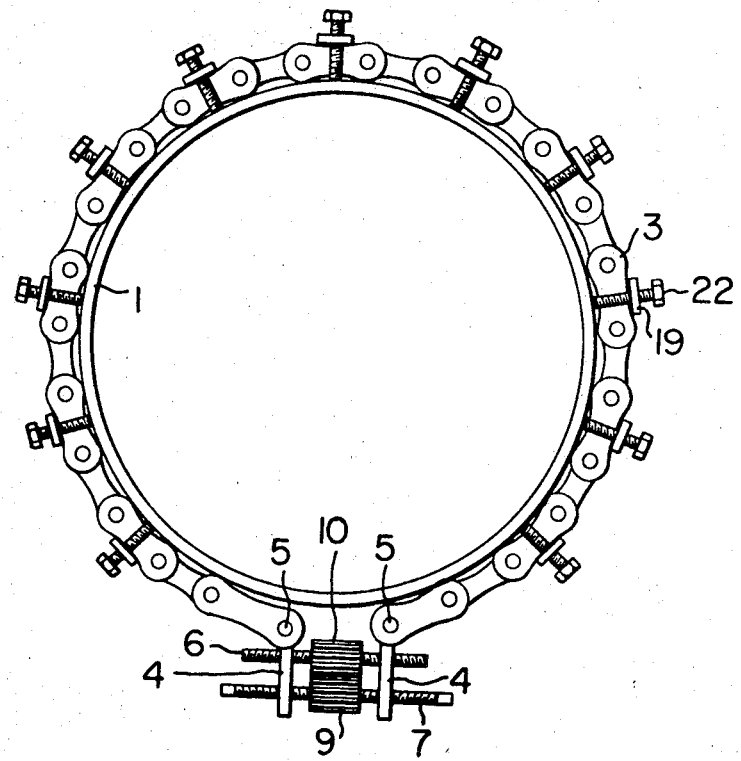
FIG. 7 is a plan view of the apparatus shown in FIG. 6.

When an end plate 16 is joined to a cylindrical section as shown in the embodiment of FIG. 5, there is a possibility that said L-shaped link plate could slip since the end plate 16 is curved. Therefore, it is preferred that screws 17 and 18 be used on both upper and lower portions of the plate 12. Foot 14 could then be omitted.

It is also preferred that the pin 5 be replaceable for increasing or decreasing the number of the links of linked roller chain in order to accommodate for the variations of diameter of the cylindrical section. Also the number of L-shaped link plates 12 can be altered appropriately.

Another embodiment of link plate is shown in FIGS. 6, 7, 8 and 9, wherein link plate 19 is not L-shaped but straight, and said link plates 19 are removably attached to selected link of said roller chain 3. Said attaching means includes upper and lower brackets 20 and 21 connected respectively to the top and bottom of said selected link of said roller chain. Said link plate 19 is removably connected at said lower bracket 21. A screw 22 is inserted through the upper end of said link plate 19 so that said upper bracket 20 contacts said second cylindrical sections 2 to vary the shape of the peripheral surface of said second section 2 in accordance with variations in said first cylindrical section caused by variations in said adjustable linkage means.

Figure 9:
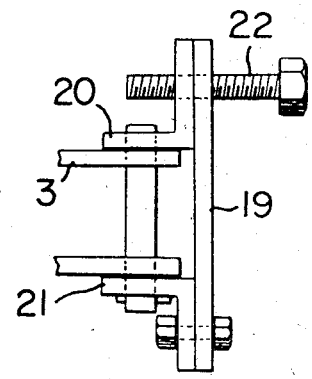
FIG. 9 is the side elevational view of the structure shown in FIG. 8.

The subsequent removal of the adjustable linkage means is readily accomplished, as it can be seen especially in FIG. 9. The operation is achieved simply by first loosening screw 22, removing the (unnumbered) fastening bolt located at the opposite, lower end of plate 19, and then withdrawing the pin (unnumbered) positioned directly underneath the angle piece or link plate 21, which plate can, consequently, be detached from the chain link 3. These steps result in the removal of the adjustable linkage means.

The foregoing illustrative embodiments of the invention represent examples of structure presently contemplated. It is contemplated that various modifications may be made and consequently the invention should be broadly construed in accordance with its full spirit and scope of the appended claims.

What I claim is:

1. Apparatus for aligning the ends of cylindrical sections to be joined comprising an adjustable band surrounding one of said sections to be joined, at least two plates, one end of each of said plates being connected to said band and adjustment means in the second end of each of said plates, said adjustment means being arranged to bear against said second cylindrical section to vary the peripheral cross section of said second cylindrical section in accordance with said first cylindrical section.

2. Apparatus in accordance with claim 1, wherein said adjustable band comprises a linked roller chain and means for varying the effective length of said roller chain.

3. Apparatus in accordance with claim 2, wherein said plates are removably attached to selected links of said roller chain.

4. Apparatus in accordance with claim 2, wherein said varying means includes binders provided at the terminal link of said linked roller chain, a pair of oppositely threaded shafts supporting said binders, intermeshing gear means mounted on each said shaft, whereby rotation of one of said shafts effects the effective length of said linked roller chain connected thereto.

5. Apparatus in accordance with claim 2, wherein said plates are L-shaped and fixedly attached to a selected link of said roller chain, the foot of said L-shaped plates being approximately equal to the width of a link in said roller chain and said adjustment means are threadably inserted through the upper end of said plates to contact said second cylindrical section to vary the peripheral cross section of said second cylindrical section in accordance with said first cylindrical section.

6. Apparatus in accordance with claim 2, wherein said plates are removably attached to selected links of said roller chain, and including attaching means comprising an upper and a lower bracket connected respectively to the top and bottom of a selected link of said roller chain, said plates being removably connected at said lower bracket, and further including means threadably inserted through the upper end of said plates and said upper bracket to contact said second cylindrical sections to vary the shape of the peripheral surface of said second section in accordance with said first cylindrical section.